United States Patent
Evans et al.

(10) Patent No.: US 10,605,228 B2
(45) Date of Patent: Mar. 31, 2020

(54) METHOD FOR CONTROLLING OPERATION OF A WIND TURBINE

(71) Applicant: General Electric Company, Schenectady, NY (US)

(72) Inventors: Scott Charles Evans, Burnt Hills, NY (US); Sara Simonne Louisa Delport, Vlaams-Brabant (BE); Samuel Davoust, Bavaraia (DE); Nurali Virani, Schenectady, NY (US); Samuel Bryan Shartzer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/105,076

(22) Filed: Aug. 20, 2018

(65) Prior Publication Data
US 2020/0056589 A1    Feb. 20, 2020

(51) Int. Cl.
| | | |
|---|---|---|
| F03D 7/04 | (2006.01) | |
| F03D 17/00 | (2016.01) | |
| F03D 7/02 | (2006.01) | |

(52) U.S. Cl.
CPC ............. *F03D 7/046* (2013.01); *F03D 7/028* (2013.01); *F03D 7/047* (2013.01); *F03D 7/048* (2013.01);
(Continued)

(58) Field of Classification Search
CPC ........ F03D 7/046; F03D 7/0276; F03D 7/028; F03D 7/048
See application file for complete search history.

(56) References Cited

U.S. PATENT DOCUMENTS

| | | |
|---|---|---|
| 8,239,071 B2 | 8/2012 | Lausen |
| 8,712,593 B2 | 4/2014 | Bjertrup et al. |
(Continued)

FOREIGN PATENT DOCUMENTS

| | | |
|---|---|---|
| EP | 1 873 396 A2 | 1/2008 |
| EP | 2048562 B1 | 8/2009 |
(Continued)

OTHER PUBLICATIONS

Shen et al., "Wind turbine aerodynamics and loads control in wind shear flow", Energy, vol. 36, Issue: 3, pp. 1424-1434, Mar. 2011.
(Continued)

*Primary Examiner* — Mark A Connolly
(74) *Attorney, Agent, or Firm* — Dorrity & Manning, P.A.

(57) ABSTRACT

A method for controlling operation of a wind turbine includes collecting training data, training a machine learning model, obtaining recent data, and applying the machine learning model the recent data to output a reference power or reference power differential corresponding to the recent data. The machine learning model is then applied to the recent data to output at least one of estimated power or estimated power differential corresponding to values of the pitch setpoints and the tip speed ratio setpoints which differ from the recent data. A turbine setting is determined by comparing the estimated power or estimated power differential to the reference power or reference power differential, and then applying the turbine setting to the wind turbine if the estimated power or estimated power differential is greater than or equal to a threshold amount above the reference power or reference power differential.

20 Claims, 6 Drawing Sheets

(52) U.S. Cl.
CPC ..... *F05B 2270/32* (2013.01); *F05B 2270/321* (2013.01); *F05B 2270/325* (2013.01); *F05B 2270/327* (2013.01); *F05B 2270/329* (2013.01); *F05B 2270/709* (2013.01)

(56) References Cited

U.S. PATENT DOCUMENTS

| | | | |
|---|---|---|---|
| 9,261,076 | B2 | 2/2016 | Abdallah et al. |
| 9,551,322 | B2 | 1/2017 | Ambekar et al. |
| 9,644,612 | B2 | 5/2017 | Evans et al. |
| 9,790,921 | B2 | 10/2017 | Egedal et al. |
| 2013/0184838 | A1* | 7/2013 | Tchoryk, Jr. ......... G05B 13/042 700/31 |
| 2016/0265509 | A1 | 9/2016 | Movsichoff |
| 2016/0333854 | A1* | 11/2016 | Lund ....................... F03D 7/047 |
| 2017/0122289 | A1 | 5/2017 | Kristoffersen et al. |
| 2017/0350369 | A1 | 12/2017 | Evans et al. |
| 2018/0156196 | A1* | 6/2018 | Kjær ..................... F03D 7/0224 |

FOREIGN PATENT DOCUMENTS

| | | |
|---|---|---|
| EP | 2213873 A1 | 8/2010 |
| WO | WO 2017/211367 A1 | 12/2017 |

OTHER PUBLICATIONS

Wagner et al., "Accounting for the speed shear in wind turbine power performance measurement", Wind Energy, vol. 14, Issue: 8, pp. 993-1004, Oct. 3, 2011.

European Search Report, dated Jan. 15, 2020.

* cited by examiner

METHOD FOR CONTROLLING OPERATION OF A WIND TURBINE

BACKGROUND

The field of the disclosure relates to controlling power generation systems, and more particularly to a method for controlling the power output of a wind turbine based upon current machine operating conditions and environmental conditions.

Many known systems include interconnected dynamic elements that change over time, and such systems are known as dynamic systems. One known dynamic system includes wind inflow acting on a wind turbine. Most known wind turbines include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, include rotor blades having predetermined shapes and dimensions. The rotor blades transform kinetic wind energy into induced blade aerodynamic forces that further induce a mechanical rotational torque that drives one or more generators that generate electric power. A plurality of wind turbine generators in a localized geographic array is typically referred to as a wind farm or a wind park.

Wind turbines are exposed to large variations in wind inflow, which exerts varying loads to the wind turbine structure, particularly the wind turbine rotor and shaft. In some cases, wind turbine settings may be changed twice per year, once in the summer and once in the winter. However, wind characteristics vary greatly during both of these seasons and a single setting does not optimize annual energy production.

BRIEF DESCRIPTION

In one aspect, a method for controlling operation of a wind turbine is provided. The method includes a collecting training data step. The training data includes pitch setpoints, tip speed ratio setpoints, and historical data regarding one or more operational conditions of the wind turbine including a power output or power differential of the wind turbine. A training step trains a machine learning model by applying the training data to the machine learning model. An output of the machine learning model is an estimated power or estimated power differential of the wind turbine based on the training data. The machine learning model is then stored. An obtaining step obtains recent data regarding one or more operational conditions of the wind turbine. An applying step applies the machine learning model to the recent data to output a reference power or reference power differential corresponding to the recent data. A second applying step applies the machine learning model to the recent data to output at least one estimated power or estimated power differential corresponding to values of the pitch setpoints and the tip speed ratio setpoints which differ from the recent data. A determining step determines a turbine setting by comparing the estimated power or estimated power differential to the reference power or reference power differential, and applying the turbine setting to the wind turbine if the estimated power or estimated power differential is greater than or equal to a threshold amount above the reference power or reference power differential. The estimated power is compared to the reference power, and/or the estimated power differential is compared to the reference power differential. The obtaining, applying and determining steps are repeated at a predetermined time interval.

In another aspect, a method for controlling operation of a power generation system is provided. The power generation system may be a gas turbine, steam turbine, hydroelectric turbine, compressor, generator, wind turbine, or any other system that produces power. The method includes a collecting training data step. The training data includes historical data regarding one or more operational conditions of the power generation system including a power output or a power differential of the power generation system. A training step trains a machine learning model by applying the training data to the machine learning model. An output of the machine learning model is an estimated power or estimated power differential of the power generation system based on the training data. The machine learning model is stored. An obtaining step obtains recent data regarding one or more operational conditions of the power generation system. An applying step applies the machine learning model to the recent data to output a reference power or reference power differential corresponding to the recent data. A second applying step applies the machine learning model to the recent data to output at least one estimated power or estimated power differential which differ from the recent data. A determining step determines a power generation system setting by comparing the estimated power or estimated power differential to the reference power or reference power differential, and applying the power generation system setting to the power generation system if the estimated power or estimated power differential is greater than or equal to a threshold amount above the reference power or reference power differential. The estimated power is compared to the reference power, and/or the estimated power differential is compared to the reference power differential. The obtaining, applying and determining steps are repeated at a predetermined time interval.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION OF THE DISCLOSURE

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), flash drive, and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers. As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein.

Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Figure 1:
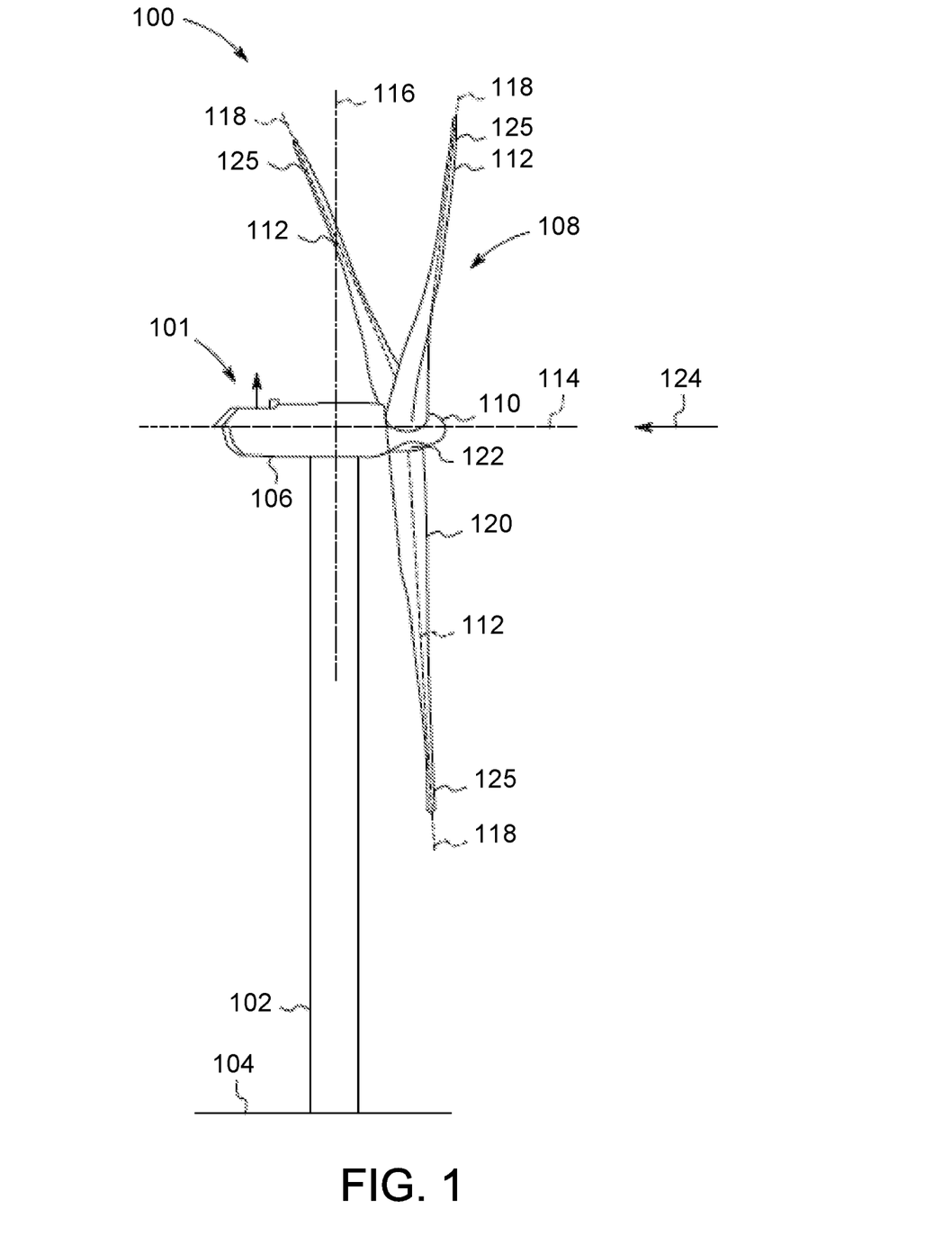
FIG. 1 is a schematic view of a wind turbine that is regulated through the wind turbine control method herein described.
Figure 2:
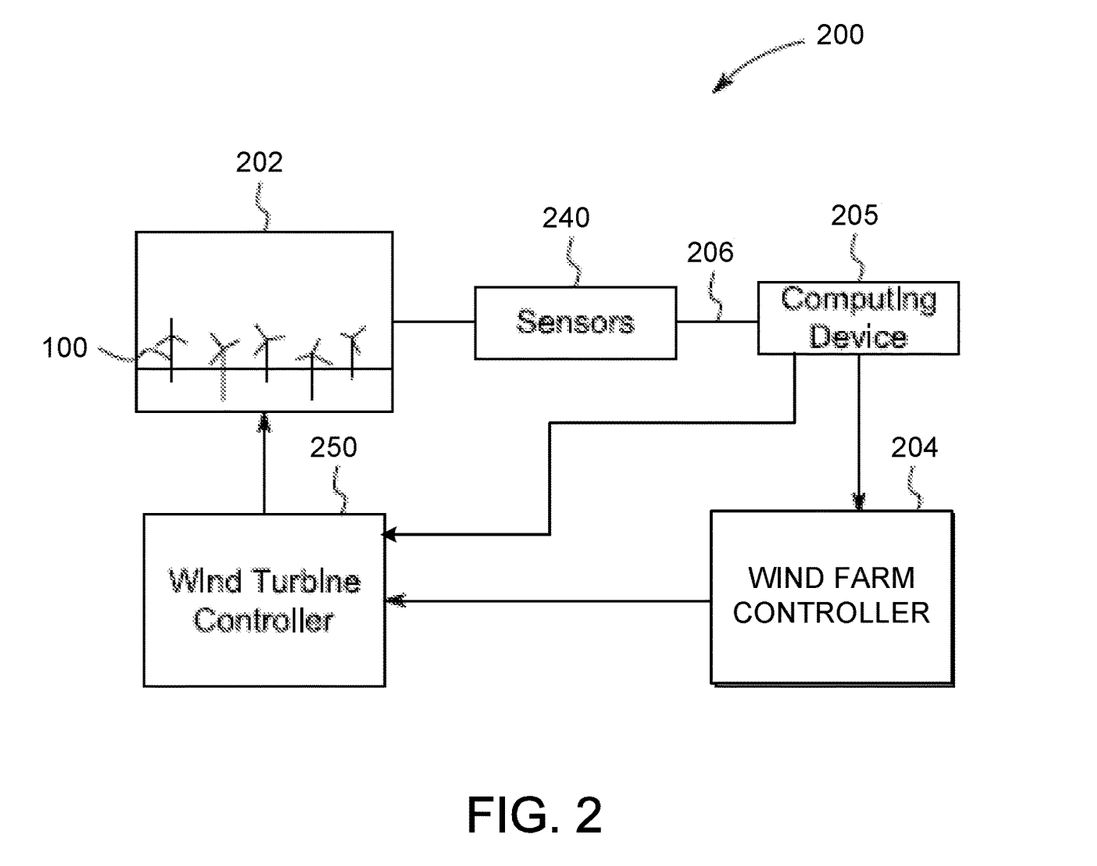
FIG. 2 is a block diagram of a portion of a wind turbine control system.

FIG. 1 is a schematic view of an exemplary wind turbine 100 that is monitored and controlled through a wind turbine control system 200 (shown in FIG. 2). In the exemplary embodiment, wind turbine 100 is a horizontal axis wind turbine. A power generation system may be substituted for wind turbine 100, and a power generation system includes a gas turbine, steam turbine, hydroelectric turbine, compressor, generator, wind turbine, or any other system that produces power. Wind turbine 100 includes a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine 100 to function as described herein. In the exemplary embodiment, tower 102 is fabricated from tubular steel and has a cavity (not shown in FIG. 1) extending between supporting surface 104 and nacelle 106. Alternatively, tower 102 is any tower that enables wind turbine 100 to function as described herein including, but not limited to, a lattice tower. The height of tower 102 is any value that enables wind turbine 100 to function as described herein.

Blades 112 are positioned about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of blades 112 with respect to the direction of wind 124. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122. Each of blades 112 also includes a blade tip portion 125.

In the exemplary embodiment, blades 112 have a length between 50 meters (m) (164 feet (ft)) and 100 m (328 ft), however these characteristics form no limitations to the instant disclosure. Alternatively, blades 112 have any length that enable wind turbine to function as described herein. As wind 124 strikes each of blades 112, aerodynamic forces (not shown) are induced on each of blades 112 and rotation of rotor 108 about rotation axis 114 is induced as blade tip portions 125 are accelerated. A pitch position, or pitch angle (not shown) of blades 112, i.e., an angle that determines each of blades' 112 orientation with respect to the rotor plane, is changed by a pitch adjustment mechanism (not shown in FIG. 1).

Further, in FIG. 1, reference numeral 124 is generally representative of wind. Since wind 124 is distributed spatially and temporally, wind speed varies significantly at different points over the area swept by wind turbine blades 112. Therefore, different portions of wind turbine 100 experience different wind speeds. The pitch angles of blades 112 are adjusted about a pitch axis 118 for each of blades 112. In the exemplary embodiment, the pitch angles of blades 112 are controlled individually. Alternatively, blade 112 pitch is controlled as a group. Still further alternatively, the pitch of the blades are modulated.

FIG. 2 is a schematic view of an exemplary wind turbine control system 200. In the exemplary embodiment, system 200 includes sensors 240 located proximate to, in, within, on, or otherwise attached to, at least one component of at least one wind turbine 100 in a wind farm 202. In the exemplary embodiment, wind turbine control system 200 includes wind farm controller 204 and a plurality of wind turbine controllers 250 coupled to wind farm controller 404. Sensors 240 are coupled to computing device 205 through a network 206 or data transmission cable 206. Wind farm controller 204 primarily controls each wind turbine 100 in wind farm 202 through wind turbine controllers 250 as a function of an inferred, detected or calculated or estimated wind characteristic/condition, such as wind shear, based on analyses by computing device 105, or by other operational or environmental characteristics/conditions (e.g., wind turbine load data, wind speed, wind shear, wind turbulence, generator speed, and air temperature). This may include regulating the angular rotor speed (revolutions per minute, i.e., rpm) and pitch angles of blades 112 about pitch axis 118 (both shown in FIG. 1). Computing device 205 is configured to generate and transmit at least one wind turbine command signal to wind farm controller 204. Wind farm controller 204 transmits the command signal to wind turbine controllers 250 to regulate operation of wind turbines 100 in wind farm 202. Alternatively, computing device 205 can transmit command signals directly to individual wind turbine controllers 250. In another alternative embodiment, wind farm control system 200 does not include wind farm controller 204 and computing device 205 communicates directly with wind turbine controllers 250.

Figure 3:
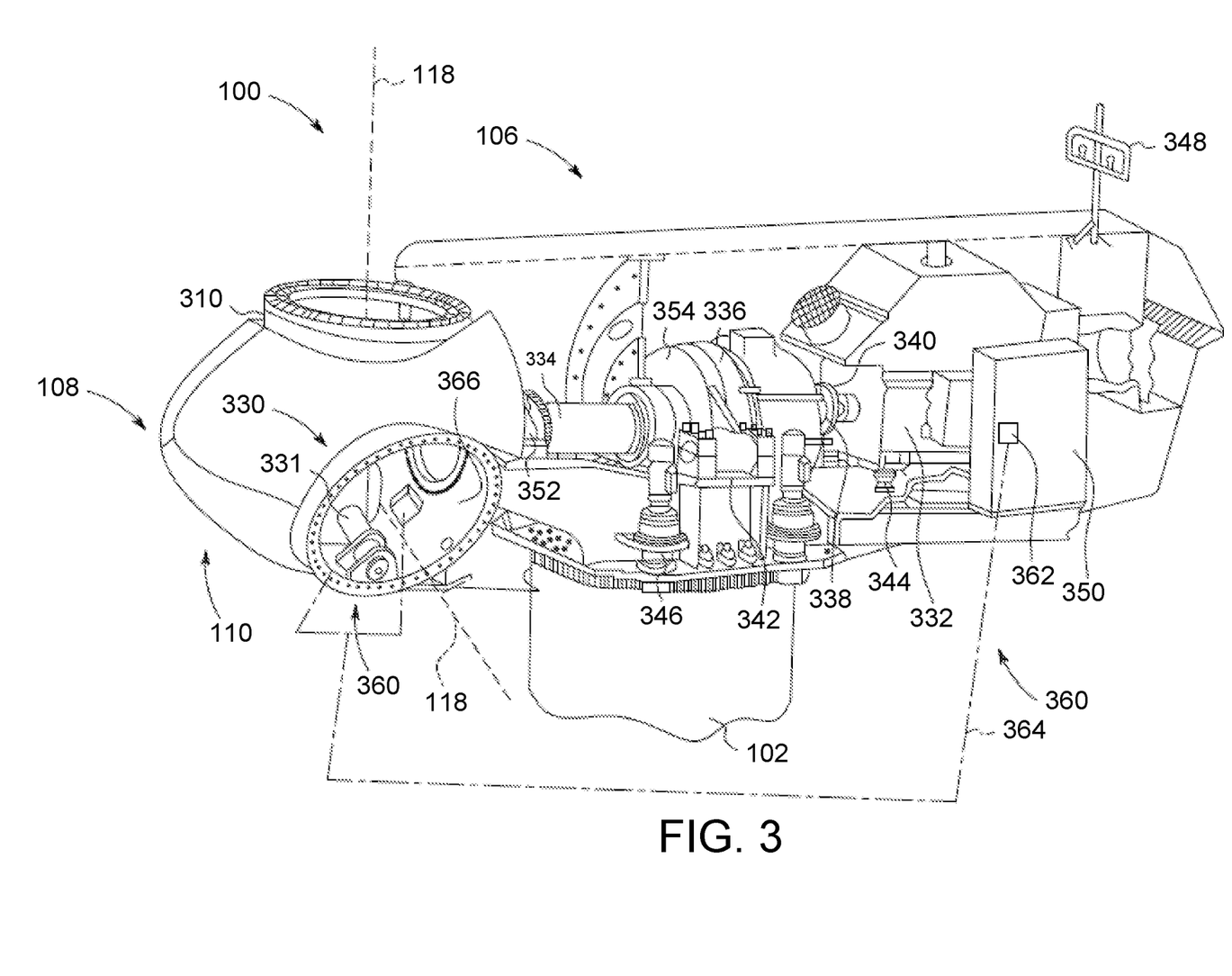
FIG. 3 is a cross-sectional schematic view of a nacelle of the wind turbine shown in FIG. 1.

FIG. 3 is a cross-sectional schematic view of nacelle 106 of exemplary wind turbine 100. Various components of wind turbine 100 are housed in nacelle 106 atop tower 102 of wind turbine 100. Nacelle 106 includes one pitch drive mechanism (or pitch system) 330 that is coupled to one blade 112 (shown in FIG. 1), where mechanism 330 modulates the pitch of associated blade 112 along pitch axis 118. In the exemplary embodiment, the pitch drive mechanism 330 includes at least one pitch drive motor 331.

Nacelle 106 also includes a rotor 108 that is rotatably coupled to an electric generator 332 positioned within nacelle 106 via rotor shaft 334, a gearbox 336, a high speed shaft 338, and a coupling 340. Rotation of shaft 334 rotatably drives gearbox 336 that subsequently rotatably drives shaft 338. Shaft 338 rotatably drives generator 332 via coupling 340 and shaft 338 rotation facilitates generator 332 production of electrical power. Gearbox 336 and generator 332 are supported by supports 342 and 344, respectively. In the exemplary embodiment, gearbox 336 utilizes a dual path geometry to drive high speed shaft 338. Alternatively, main rotor shaft 334 is coupled directly to generator 332 via coupling 340.

Nacelle 106 further includes a yaw adjustment mechanism 346 that is used to rotate nacelle 106 and rotor 108 on an axis to control the perspective of blades 112 with respect to the direction of the wind. Nacelle 106 also includes at least one meteorological mast 348, where mast 348 includes a wind vane and anemometer. Mast 348 provides information to a turbine control system (not shown) that includes wind direction and/or wind speed. Nacelle 106 further includes forward and aft support bearings 352 and 354, respectively, where bearings 352 and 354 facilitate radial support and alignment of shaft 334.

A portion of a turbine control system resides within a control panel 350. Wind turbine 100 includes a pitch control system 360, where at least a portion of pitch control system 360 is positioned in nacelle 106, or alternatively, outside nacelle 106. Specifically, at least a portion of pitch control system 360 described herein includes at least one wind turbine regulation device, i.e., processor 362 and a memory device (not shown), and at least one input/output (I/O) conduit 364, where conduit 364 includes at least one I/O channel (not shown). More specifically, processor 362 is positioned within control panel 350.

Processor 362 and other processors (not shown) as described herein process information transmitted from a plurality of electrical and electronic devices that includes, but not be limited to, blade pitch position feedback devices 366 (described further below) and electric power generation feedback devices (not shown). RAM and storage devices (not shown) store and transfer information and instructions to be executed by processor 362. RAM and storage devices can also be used to store and provide temporary variables, static (i.e., non-changing) information and instructions, or other intermediate information to processor 362 during execution of instructions by processor 362. Instructions that are executed include, but are not limited to, resident blade pitch system control commands. The execution of sequences of instructions is not limited to any specific combination of hardware circuitry and software instructions.

In the exemplary embodiment, at least a portion of pitch control system 360 including, but not limited to, processor 362 is positioned within control panel 350. Moreover, processor 362 is coupled to blade pitch drive motors 331 via at least one I/O conduit 364. I/O conduit 364 includes any number of channels having any architecture including, but not limited to, Cat 5/6 cable, twisted pair wiring, and wireless communication features. Pitch control system 360 includes distributed and/or centralized control architectures, or any combination thereof.

Pitch control system 360 also includes a plurality of independent blade pitch position feedback devices 366 coupled with processor 362 via at least one I/O conduit 364. In the exemplary embodiment, each pitch drive mechanism 330 is associated with a single blade pitch position feedback device 366 (also known as a blade pitch position device or a position feedback device). Alternatively, any number of blade pitch position feedback devices 366 are associated with each mechanism 330. Therefore, in the exemplary embodiment, mechanism 330 and associated drive motor 331, as well as device 366, are included in system 360 as described herein. Each blade pitch position feedback device 366 measures a pitch position of each blade 112 with respect to rotor hub 110. Blade pitch position feedback device 366 is any suitable sensor having any suitable location within or remote to wind turbine 100, such as, but not limited to, optical angle encoders, magnetic rotary encoders, and incremental encoders, or some combination thereof. Moreover, blade pitch position feedback device 366 transmits pitch measurement signals (not shown) that are substantially representative of associated blade 112 pitch position to processor 362 for processing thereof.

Figure 4:
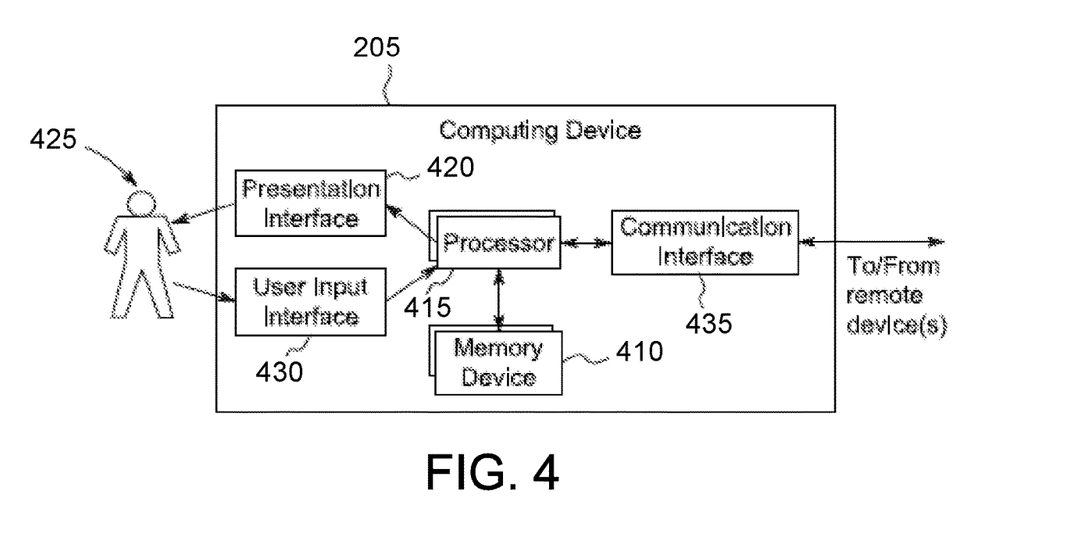
FIG. 4 is a block diagram of an exemplary computing device.

FIG. 4 is a block diagram of an exemplary computing device 205 used to infer, estimate, calculate or obtain one or more characteristics/conditions based on sensor measurements received from one or more sensors. In one embodiment, computing device 205 is used to infer one or more environmental characteristics/conditions or operating conditions based on sensor measurements received from one or more sensors in or on a wind turbine. In this embodiment, computing device 205 is further used to facilitate operation of a wind turbine through a wind turbine control system. Computing device 205 controls the operation of the wind turbine at least partially using the one or more environmental characteristics or operating conditions.

Computing device 205 includes a memory device 410 and a processor 415 operatively coupled to memory device 410 for executing instructions. In some embodiments, executable instructions are stored in memory device 410. Computing device 205 is configurable to perform one or more operations described herein by programming processor 415. For example, processor 415 may be programmed by encoding an operation as one or more executable instructions and providing the executable instructions in memory device 410. In the exemplary embodiment, memory device 410 is one or more devices that enable storage and retrieval of information such as executable instructions and/or other data. Memory device 410 may include one or more computer readable media.

Memory device 410 is configured to store sensor data. For example, memory device 410 stores, without limitation, atmospheric condition measurements, wind turbine operational data, mechanical load measurements, blade pitch angle measurements, and/or any other type data. Also, memory device 410 includes, without limitation, sufficient data, algorithms, and commands to facilitate (i) generating data-driven classifications of a profile from the sensor data to determine an appropriate physics-based model from which the one or more characteristics are inferred, (ii) inferring the one or more characteristics from the model, and (iii) using the one or more characteristics to regulate a dynamic system. In the exemplary embodiment, memory device 410 includes, without limitation, sufficient data, algorithms, and commands to facilitate (a) generating data-driven classifications of a wind profile from the sensor data to determine an appropriate model from which the one or more wind characteristics are inferred, (b) inferring the one or more wind characteristics from the model, and (c) using the one or more wind characteristics to regulate the wind turbine.

In some embodiments, computing device 205 includes a presentation interface 420 coupled to processor 415. Presentation interface 420 presents information to a user 425. In some embodiments, presentation interface 420 includes one or more display devices and presents, for example, sensor data and/or characteristics to user 425 using a human machine interface (HMI) (not shown in FIG. 4). Also, in some embodiments, computing device 205 includes a user input interface 430. In the exemplary embodiment, user input interface 430 is coupled to processor 415 and receives input from user 425.

A communication interface 435 is coupled to processor 415 and is configured to be coupled in communication with one or more other devices, such as one or more sensors, a wind turbine control device, or another computing device 205, and to perform input and output operations with respect to such devices while performing as an input channel. Communication interface 435 receives data from and/or transmits data to one or more remote devices. For example, a communication interface 435 of computing device 205 transmits a signal to the communication interface 435 of another computing device 205. In some embodiments, communication interface 435 is a wireless interface.

In some embodiments, computing device 205 is used to facilitate operation of a plurality of wind turbines through a wind farm controller. In these embodiments, computing device 205 includes sufficient computer-readable/executable instructions, data structures, program modules, and program sub-modules, to receive other data associated with measured values from other wind turbines and wind turbine systems to facilitate overall operation of the wind turbine park.

Figure 5:
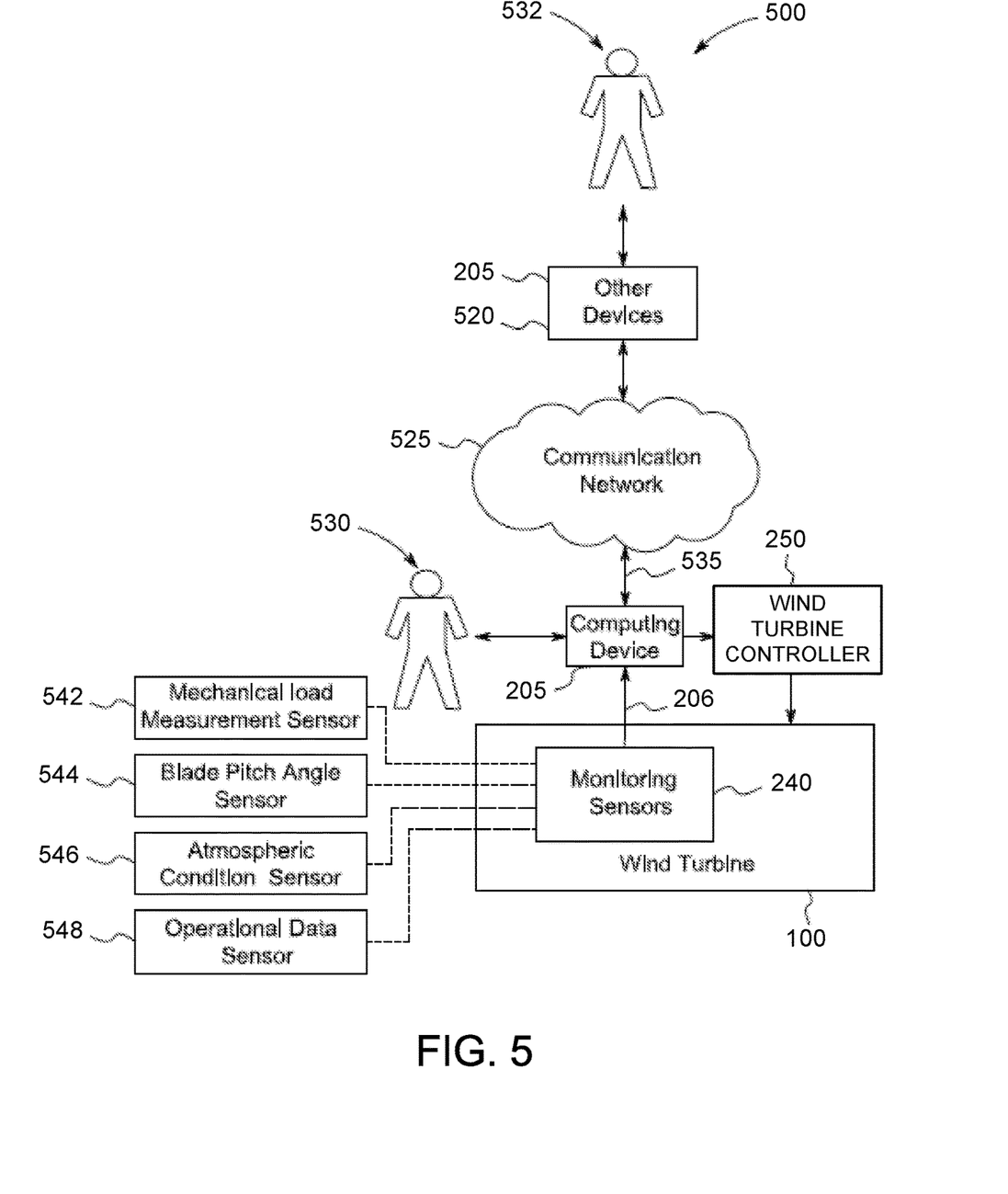
FIG. 5 is a schematic view of an exemplary wind farm or turbine control system that is used to regulate one or a plurality of the wind turbines.

FIG. 5 is an exemplary block diagram of a portion of a wind turbine control system 500 that infers, estimates, calculates or detects one or more wind characteristics and operating conditions using one or more monitoring sensors 240 (also known as measurement sensors) on a wind turbine 100. Wind turbine control system 500 is further used to control at least a portion of wind turbine 100. In the exemplary embodiment, wind turbine control system 500 obtains at least one of, wind turbine load data, wind speed, wind shear, wind turbulence, generator speed, and air temperature, as described below.

In some embodiments, wind turbine control system 500 includes sufficient computer-readable/executable instructions, data structures, program modules, and program sub-modules, to receive other data associated with measured values from other wind turbine systems to facilitate overall operation of wind turbine 100. Alternatively, wind turbine control system 500 is a stand-alone system. Further, alternatively, wind turbine control system 500 is any computer-based system that monitors portions of, and infers one or more wind and operating characteristics/conditions for wind turbine 100. In the exemplary embodiment, wind turbine control system 500 includes computing device 205 configured to execute monitoring algorithms and monitoring logic. Computing device 205 is coupled to other devices 520 via a network 525. In some embodiments, network 525 is a wireless network.

In the exemplary embodiment, computing device 205 is coupled to network 525 via communication interface 535. In an alternative embodiment, computing device 205 is integrated with other devices 520.

In the exemplary embodiment, wind turbine 100 includes one or more monitoring sensors 240 coupled to computing device 205 through at least one input channel 206. Sensors 240 include one or more mechanical load sensors 542 for obtaining load measurements. Sensors 240 may also include one or more blade pitch angle sensors 544 for obtaining blade pitch angle measurements, one or more atmospheric condition sensors 546 for obtaining atmospheric condition measurements, and/or one or more operational data sensors 548 for obtaining operational data measurements. Sensors 240 collect measurements including, without limitation, yaw, nod, pitch, multi-blade coordinate (MBC) estimated wind speed, electric output, bending moments, torsional moments, and rotations per minute (RPM) emanating from portions of wind turbine 100. Sensors 240 produce measurement sensor-signals of wind turbine 100 that are transmitted to computing device 205. Such data is transmitted across network 525 and is accessed by any device capable of accessing network 525 including, without limitation, desktop computers, laptop computers, and personal digital assistants (PDAs) (neither shown).

Sensors 240 repeatedly, e.g., periodically, continuously, and/or upon request, transmit measurement readings at the time of measurement. Alternatively, any number of measurements, any interval time, and any time window are established that enable operation of wind turbine 100 and wind turbine control system 500 as described above.

In one embodiment, computing device 205 is configured to obtain a wind shear characteristic. Computing device 205 classifies a shear profile derived from one or more sensor measurements. Based on the shear profile, computing device 205 determines an appropriate model from which the shear characteristic should be estimated. Computing device 205 then estimates the shear characteristic from the model.

More specifically, computing device 205 uses a supervised machine learning method, such as a random forest algorithm, on the sensor measurement data to classify whether the shear profile behaves according to a wind shear power law profile (as is normally assumed) or whether the profile is low level jet (where lower speed is experienced at higher elevation) or flat speed distribution (where higher elevation speed exceeds a power law prediction).

In the exemplary embodiment, the shear profile is classified using a random forests model that has been previously trained on historical data where sensors at, in one embodiment, five different elevations are configured to record prime standard wind speeds (for example, from a multi sensor Metmast or Lidar/Sodar). The random forest algorithm grows multiple decision trees. These multiple decision trees are sometimes referred to as an ensemble of trees or a random forest. Once the model has been trained, real time loads information is then applied to the ensemble of trees to obtain a classification about whether the shear profile behaves according to a power law or if a different shear profile is in effect.

After the profile has been classified using a random forest model (or other supervised machine learning model such as ridge regression, and neural network), the characteristics of the shear model can be determined from the data. If the profile is a power law profile, a single characteristic a (alpha) characterizes the shear profile. The wind profile power law is given by:

$$V(h)/V(HH)=(h/HH)^\alpha, \quad \text{Eq. (1)}$$

where V=wind velocity, HH=height 1 (lower height), h=height 2 (upper height), and α=wind shear exponent. Wind shear is quantified as the wind shear exponent a in the power law equation that relates wind speeds at two different heights. The wind shear exponent a can be determined from the data by minimizing a fitting error metric, eg., mean squared error, between the training data and the power law shear profile. In practice, a varies with such characteristics as elevation, time of day, season, temperature, terrain, and atmospheric stability. A larger exponent means a larger vertical gradient in the wind speed. If computing device 205 determines that the shear profile is consistent with the power law, the wind shear exponent a is inferred as the wind shear characteristic.

If the profile is not a power law, two characteristics are determined that can describe a more complex shear profile. More specifically, if computing device 205 determines that the shear profile does not behave according to the wind profile power law, computing device 205 uses a fitted quadratic model with a and b characteristics in a quadratic fit. The fitted quadratic model represents a low level jet (LLJ) stream or a flat (near linear) speed distribution. The fitted quadratic model is given by:

$$V(h)=V(HH)[a(h-HH)^2+b(h-HH)+1], \quad \text{Eq. (2)}$$

where V=wind velocity, HH=height 1 (lower height), h=height 2 (upper height), a=first quadratic fit coefficient, and b=second quadratic fit coefficient.

The fitted quadratic model fits one quadratic function ($a_i$, $b_i$) of shear to five different elevations of wind speed, where i represents the elevation. Characteristics $a_i$ and $b_i$ are the coefficients of the quadratic model, where a represents curvature and b represents the slope. The characteristic b is close to a (alpha) when the wind profile is close to the power law. As with the wind shear exponent a (alpha) above, characteristics $a_i$ and $b_i$ are determined by minimizing mean squared error between actual velocity measurements determined by sensors 240 over a range of altitudes and predicted velocities over the range of altitudes. Typically, the curvature coefficient a will be small for a flat profile and larger for a low level jet profile.

When the fitted quadratic model is rewritten in its derivative form, the quadratic fit coefficient b' is the inferred wind shear characteristic, and equals the shear exponent a given in the power law. This can be proven using a Taylor expansion of the power law to prove that b'=α. As such, in some embodiments, computing device 105 is configured to identify a or the quadratic characteristics independent of the type of profile. In these embodiments, the step of identifying the type of profile (for example, power law, LLJ, or flat) is not performed after inferring the characteristic(s).

The shear profiles are driven by different power differentials. A power differential is defined as the difference in power from that which is expected given some objective reference. For example, wind turbines are generally described by wind power curves that provide the expectation of power given a wind speed as input. Power differential in this context would be (($P_{actual}-P_{expected}$)|wind speed). Other objective references can be used to generate power differential, such as control turbine power, etc. The method described herein can use any power differential metric driven by any objective source. The power law describes normal shear. The low-level jet stream profile has lower energy than the corresponding power law based on measurement up to hub height (wind speed decreases with height). The flat jet stream describes a flatter shear curve than the power law, resulting in higher energy in the wind profile (wind speed increases with height at a sharper rate than normal shear). The operation of the wind turbine can be enhanced depending on the wind conditions described by the shear profile.

Computing device 205 is further configured to generate at least one wind turbine regulation device command signal based upon the inferred wind shear characteristic. Computing device 205 is also further configured to transmit the at least one wind turbine command signal to wind turbine regulation device 250. Wind turbine controller 250 is configured to receive the at least one wind turbine command signal to regulate operation of wind turbine 100. Wind turbine controller 250 includes, but is not limited to, a pitch regulator to adjust blade pitch, a torque regulator to modulate torque in a drive train, a yaw regulator to modify a yaw position of wind turbine 100, and a mechanical brake regulator to engage a braking device for the drive train.

Regulating the operation of wind turbine 100 includes, but is not limited to, controlling the yaw of wind turbine 100, controlling the pitch of at least one of the turbine blades, controlling the power electronic converters connected to the turbine generator, controlling the power generated by wind turbine 100, controlling the rotational speed of the turbine rotor, and controlling the torque of wind turbine 100. For example, the wind turbine regulation device command signal commands the wind turbine regulation device to change the pitch of one or more rotor blade to enhance the torque or lower the loads given a particular wind shear profile.

The technical effects of using an inferred wind characteristic to at least partially control the wind turbine includes, without limitation, increasing energy production, improving life of wind turbine components, validating performance, improving fine pitch control, troubleshooting issues, and providing general information capabilities. For example, the inferred wind shear characteristic is used to increase energy production by fine pitch control or other turbine control methods, provide insight to reduce unnecessary protective tripping or curtailment that are not appropriate for the given shear profile, and/or for farm level optimization.

Moreover, wind turbine control system 500 described herein facilitates enhanced control of wind turbine 100 and/or a plurality of wind turbines 100 in a wind farm. Specifically, the embodiments described herein facilitate enhanced control of the wind turbine through determinations of real-time, day-to-day, and seasonal estimates of wind flow in a wind turbine site. As such, the embodiments described herein facilitate enhancing power generation performance and increasing annual energy production (AEP) by taking into account the time-dependent inflow variables such as wind turbine configuration changes including turbine outages and blade contamination and erosion.

While the above example includes an inferred wind (vertical) shear characteristic, a wind characteristic could also be inferred for, but not limited to, directional variations, wind speed at various heights, veer, turbulence intensity, yaw misalignment, up-flow, horizontal shear, waked state, and non-waked state. These wind characteristics could have one or more profiles that could be described by one or more models, including, but not limited to, a power law model. In alternative embodiments, one or more wind characteristics are inferred using a known single parameter model, such as a linear model or a power law.

The process described above is applicable in a number of contexts. In this case, shear is generally described using a single characteristic model and the classification step identifies when the model is inadequate. However, other characteristics may be characterized as well by models. For example, in alternative embodiments, the systems and methods described herein use a single characteristic model to infer at least one characteristic. The at least one characteristic includes, but is not limited to, a wind shear characteristic. Thus, the method is generalizable and scalable beyond shear.

In addition, different applications may emphasize different parts of the described process. For example, in one implementation, profile classification (e.g. power law, low level jet, or flat jet) to explain turbine underperformance may be emphasized, without a need to accurately model the exact shear profile. Whereas, in another implementation the profile classification is not as important as the characteristic inference. The described systems and methods provide flexibility for both.

Computing device 205 interacts with a first operator 530, e.g., without limitation, via user input interface 430 and/or presentation interface 420. In one embodiment, computing device 205 presents information about wind turbine 100, such as measured blade pitch positions, to operator 530. Other devices 520 interact with a second operator 532, e.g., without limitation, via user input interface 430 and/or presentation interface 420. For example, other devices 520 present operational information to second operator 532. As used herein, the term "operator" includes any person in any capacity associated with operating and maintaining wind turbine 100, including, without limitation, shift operations personnel, maintenance technicians, and facility supervisors.

Figure 6:
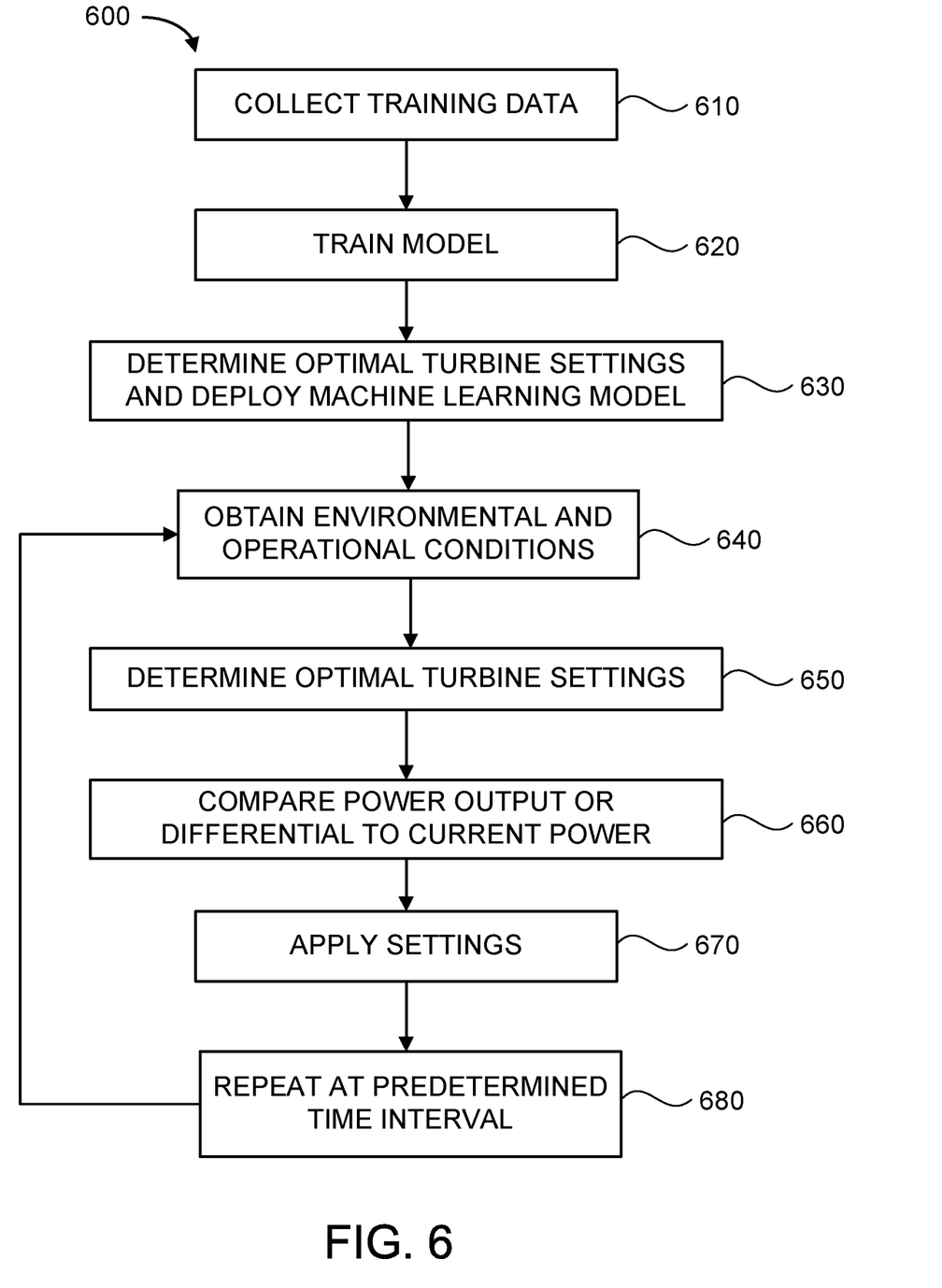
FIG. 6 is a schematic view of a method to control operation of a wind turbine, according to an aspect of the present disclosure.

FIG. 6 is a schematic view of a method 600 to control operation of a wind turbine 100. The method 600 makes use of a function to determine the power output level or change in power output level of the wind turbine. For example, the following equation may be used.

$$Y = F(\text{Pitch Setpoint}, \text{TSR Setpoint}, X_{obs}) \qquad \text{Eq. (3)}$$

In the function above, Y is the single wind turbine power differential versus a baseline. F is a prediction function, Pitch Setpoint is the pitch setting of the turbine blades, TSR Setpoint is the tip speed ratio of the rotor, and $X_{obs}$ is the available environmental observation variables and/or machine operating variables. For example, environmental observation variables are wind speed, wind direction, wind shear, wind turbulence, and air temperature, and machine operating variables are wind turbine load data, and generator speed.

Method 600 collects training data for equation 3 above in step 610. In this step the environmental observations and operating conditions of the wind turbine are obtained over a period of time. For example, the collection may occur over a time period of about one to six months, and at intervals between measurements of about one minute to one hour. In summary, the training data includes pitch setpoint, tip speed ratio setpoint, and historical data regarding environmental and operational conditions of the wind turbine. The data regarding an operational condition of the wind turbine may be a direct measurement of or an indirect estimation of wind turbine load data, power output, wind speed, wind shear, wind turbulence, wind direction, yaw misalignment, generator speed, air density and/or air temperature.

In step 620, the function of equation 3 is trained with the data obtained in step 610. The training data (acquired in step 610) is applied to the function (equation 3) that determines an estimated power output or power differential of the wind turbine based on the training data and multiple wind speeds. Outputs of the function are stored in a machine learning model. The training step 620 is performed via a machine learning model/algorithm or statistical regression algorithm using one of support vector machines, gaussian processes, or random forest, neural networks, Bayesian regression, linear regression or non-linear regression. The value of Y is calculated for each pitch and tip speed ratio setpoint combination to optimize the maximum value of Y.

In step 630, a determination of the optimal wind turbine settings for the various $X_{obs}$ variables is made. For example, based on one or more of wind speed, wind shear, wind turbulence, air temperature, wind turbine loads, and generator speed, the optimal (or at least improved) settings for pitch setpoint and tip speed ratio are determined. The output of step 630 is a machine learning model that can be deployed on an individual turbine that provides the ability to compare output from various controllable settings given an input vector $X_{obs}$.

In step 640, recent (which includes current) data regarding environmental and/or operational conditions of the wind turbine is obtained. For example, a current value of the data is the value just (most recently) obtained from one or more sensors, and a recent value of the data is obtained within one hour of the present time.

In step 650, optimal turbine settings are determined by applying the recent data to the machine learning model to obtain a current estimated power output or power differential of the wind turbine for all options of controllable settings. The machine learning model exercised with the current $X_{obs}$ input enables the counterfactual question be answered, "What would the power differential be if the control settings for pitch and tip speed ratio were various different values?".

In step 660, a comparing step compares one of the current estimated power output or reference power differential to a current power output or estimated power differential of the wind turbine. The turbine setting is applied (in step 670) to the wind turbine if the estimated power output or estimated power differential is greater than or equal to a threshold amount above the current power output or reference power differential. For example, the threshold amount may be 10% of a current value or 10 kW. Alternatively, the threshold amount may be any desired percentage or fraction of the power output or power differential, or the threshold amount may be any power value as desired in the specific application (e.g., more or less than 10 kW). The turbine settings may be adjustments to blade pitch and/or tip speed ratio. There is a balancing act between power output increase versus wear and tear on the wind turbine components. For example, if the potential power increase is 1 kw, then it may not be worth the lifecycle impact on the pitch system to change the blade pitch. However, if the potential power increase is 10 kw, then it may be worth the lifecycle risks on the pitch system to change the blade pitch and increase power output, especially when this is factored over multiple wind turbines in a wind farm. In step 670, if the threshold criteria are met the optimal setting, if different from the current setting, is applied to the turbine controls. When method 600 is applied to a single wind turbine, the annual energy production of that turbine can see substantial increases.

In step 680, the method cycles back to step 640 to repeat the obtaining, determining and comparing steps at a predetermined time interval. For example, the predetermined time interval may be about 10 seconds to about 1 hour.

An exemplary technical effect of the method described herein includes at least one of: (a) increased annual energy production; (b) real-time knowledge of wind and environmental conditions on a wind turbine site is used in control strategies for one or more of the following: enhancing power generation performance, increasing annual energy production (AEP), and reducing mechanical loads; (c) increasing the accuracy in predicting the power performance and loads of wind turbines under different wind conditions; (d) improving a life span of mechanical components, including wind turbine components; (e) troubleshooting issues; (f) providing general information capabilities; (g) providing insight to reduce unnecessary protective tripping or curtailment of wind turbines that is not appropriate for a given wind profile; and (h) wind farm level optimization.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for controlling operation of a wind turbine, the method comprising:
   collecting training data, the training data comprising pitch setpoints, tip speed ratio setpoints, and historical data regarding one or more operational conditions of the wind turbine including a power output or a power differential of the wind turbine;
   training a machine learning model by applying the training data to the machine learning model, an output of the machine learning model is an estimated power or estimated power differential of the wind turbine based on the training data, and the machine learning model is stored;
   obtaining recent data regarding one or more operational conditions of the wind turbine;
   applying the machine learning model to the recent data to output a reference power or reference power differential corresponding to the recent data;
   applying the machine learning model to the recent data to output at least one estimated power or estimated power differential corresponding to values of the pitch setpoints and the tip speed ratio setpoints which differ from the recent data;
   determining a wind turbine setting by comparing the estimated power or estimated power differential to the reference power or reference power differential, and applying the wind turbine setting to the wind turbine if the estimated power or estimated power differential is greater than or equal to a threshold amount above the reference power or reference power differential;
   repeating the obtaining, applying and determining steps at a predetermined time interval.

2. The method of claim 1, wherein the data regarding an operational condition of the wind turbine comprises at least one of wind turbine load data, power output, wind speed, wind speed estimation, wind shear, wind turbulence, wind direction, yaw misalignment, generator speed, air density and air temperature.

3. The method of claim 1, wherein the collecting step comprises operating the wind turbine according to a sequence of different pitch setpoints, and tip speed ratio setpoints.

4. The method of claim 1, the turbine setting further comprising at least one of:
   blade pitch, generator torque and tip speed ratio.

5. The method of claim 1, wherein the reference power or reference power differential of the wind turbine is determined by comparing a power output of the wind turbine to one or more neighboring wind turbines in a wind farm.

6. The method of claim 1, wherein the reference power or reference power differential of the wind turbine is determined by comparing a current power output of the wind turbine to a previous or a future power output of the wind turbine where the pitch setpoint and tip speed ratio setpoint have been set to repeated reference values during the collecting step.

7. The method of claim 1, wherein a yaw offset setpoint is used in addition the to the pitch setpoint and the tip speed ratio setpoint.

8. The method of claim 1, wherein the predetermined time interval is about 10 seconds to about 1 hour.

9. The method of claim 1, wherein the threshold amount is 10%.

10. The method of claim 1, wherein the threshold amount is 10 kw.

11. The method of claim 1, wherein the training step is performed via a machine learning or statistical regression algorithm comprising one of:
   support vector machines, gaussian processes, or random forest, neural networks, Bayesian regression, linear regression or non-linear regression.

12. The method of claim 1, wherein the predetermined time interval is about 10 seconds to about 1 hour.

13. The method of claim 1, wherein the threshold amount is 10%.

14. A method for controlling operation of a power generation system, the method comprising:
   collecting training data, the training data comprising historical data regarding one or more operational conditions of the power generation system including a power output or a power differential of the power generation system;
   training a machine learning model by applying the training data to the machine learning model, an output of the machine learning model is an estimated power or estimated power differential of the power generation system based on the training data, and the machine learning model is stored;
   obtaining recent data regarding one or more operational conditions of the power generation system;
   applying the machine learning model to the recent data to output a reference power or reference power differential corresponding to the recent data;
   applying the machine learning model to the recent data to output at least one estimated power or estimated power differential which differ from the recent data;
   determining a power generation system setting by comparing the estimated power or estimated power differential to the reference power or reference power differential, and applying the power generation system setting to the power generation system if the estimated power or estimated power differential is greater than or equal to a threshold amount above the reference power or reference power differential;
   repeating the obtaining, applying and determining steps at a predetermined time interval.

15. The method of claim 14, wherein the data regarding an operational condition of the wind turbine comprises at least one of power generation system load data, power output, wind speed, wind speed estimation, wind shear, wind turbulence, wind direction, yaw misalignment, generator speed, air density and air temperature.

16. The method of claim 15, wherein the reference power of the power generation system is determined by comparing a power output of the power generation system to a reference power of one or more similar power generation systems.

17. The method of claim 15, wherein the reference power differential of the power generation system is determined by comparing a power differential of the power generation system to power differentials of one or more similar power generation systems.

18. The method of claim 14, wherein the reference power or reference power differential of the power generation system is determined by comparing a current power output of the power generation system to a previous or a future power output of the power generation system where the power generation system setting has been set to repeated reference values during the collecting step.

19. The method of claim 1, wherein the threshold amount is 10 kw.

20. The method of claim 14, wherein the training step is performed via a machine learning or statistical regression algorithm comprising one of:
   support vector machines, gaussian processes, or random forest, neural networks, Bayesian regression, linear regression or non-linear regression.

* * * * *